T. W. PAGE.
Convertible Planters and Cultivators.

No. 156,590. Patented Nov. 3, 1874.

Figure 5:
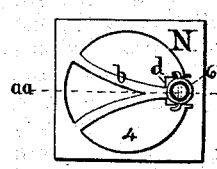
Figures 6, 7:
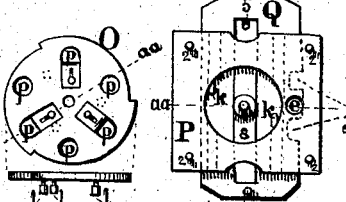

(Sec. of figs. 5, 6, & 7 on dotted lines "a a")

Witnesses:
John Paine
Edw. Helm

Thomas W. Page
by E. Thurlow, his Atty. in fact

UNITED STATES PATENT OFFICE.

THOMAS W. PAGE, OF CANTON, ILLINOIS, ASSIGNOR OF THREE-FOURTHS HIS RIGHT TO MARTIN HOFFMAN AND WILLIAM BABCOCK, SR., OF SAME PLACE.

IMPROVEMENT IN CONVERTIBLE PLANTERS AND CULTIVATORS.

Specification forming part of Letters Patent No. 156,590, dated November 3, 1874; application filed July 11, 1874.

*To all whom it may concern:*

Be it known that I, THOMAS W. PAGE, of Canton, in the county of Fulton and in the State of Illinois, have invented an Improvement in Convertible Corn-Planters; and do hereby declare that the following is a full, clear, and exact description thereof, reference being had to the annexed drawings, making a part of this specification, in which like letters of reference refer to like parts, and in which—

Figures 1, 3:
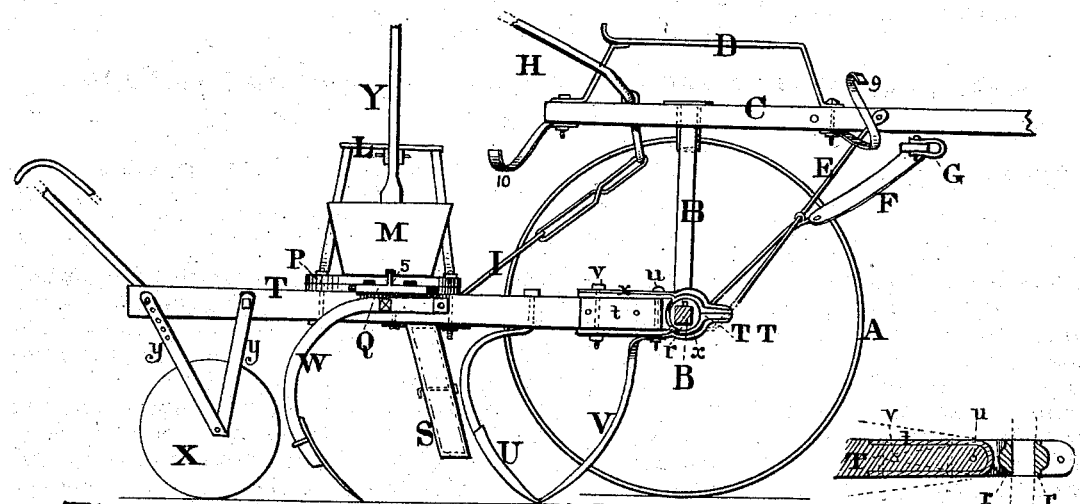
Figure 2:
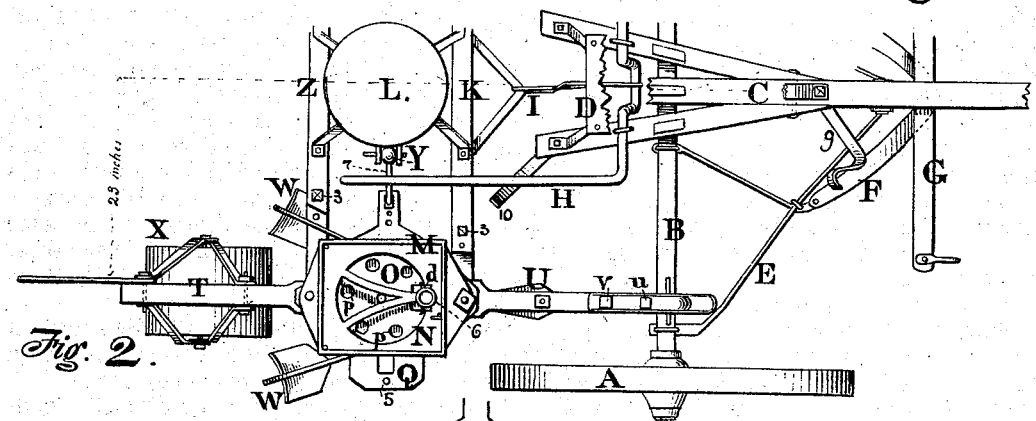
Figure 8:
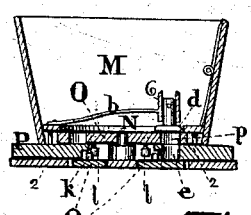

Figure 1 represents a side elevation, (one wheel being removed;) Fig. 2, a plan view of one-half of the machine; Fig. 3, a central horizontal section of the coupling of the beams to the axle; Fig. 5, a plan view of the uppermost plate of the cut-off mechanism; Fig. 6, a plan view of rotary cut-off disk with an elevation; Fig. 7, a plan view of the lowermost plate of the cut-off mechanism with the slide below; Fig. 8, a central cross-section (vertical) of the corn-box and dropping or cut-off mechanism.

The object of my invention is not only to combine a planter and cultivator in one and the same machine, but cultivate the soil at the same time that the seed is planted, and to gage the depth of the shovels in cultivating by means of rollers.

The shovels are made removable and interchangeable from front to rear, for the various requirements in preliminary and post-planting cultivation.

The machine is shown in the drawings as a corn-planter, in which all the shovels are used in tilling the soil at the same moment with the planting of the seed.

The change of parts to make the machine a cultivator will be described hereinafter.

I employ the arched form of axle, called the "straddle-row," mounted upon the usual wheels A, which carry the tongue or pole C, seat D, lever H for raising or lowering the beams T, and their shovels. The lever H is pivoted across the heel of the pole, and has a rod, I, attached to the crank, and which runs to the cross-brace K which unites the two seed-boxes M. The draft-bar G is attached to the V-shaped braces F F, which, after uniting with a brace-rod, E, on either side of the machine, is fastened to the axle as well as said rod E—one at the knee of the arch, the other outside of the couplings $T^2$ $T^2$.

The seed-boxes M M are placed one behind each of the forward shovels U on each beam. I use three shovels on a beam, T, each hinged to the axle B by a sliding universal knuckle-joint, $T^2$, hereafter described.

The shovels U are provided with a curved knife or colter, V, running from the point of each, up to their respective beams or couplings, to a bolt, $u$. These shovels precede their respective seed-spouts S S, and each are followed by a pair of shovels, W W, bolted to either side of the beam in the rear of each seed-box, and these are followed closely by a roller, X, attached to each beam by braces $y$ $y$ $y$ $y$, pairs of which are pierced with holes for a bolt in the beam to raise or lower their respective rollers in gaging the depth of their preceding shovels.

In planting, the rollers X pulverize the soil over the planted corn, but are removable when the machine is used in cultivating alone.

The beams are each provided with the usual handles, and can be set at various distances apart, either in planting or cultivating, by the adjustment of the bolts 3 3, in either of the holes in the extensions, which unite each brace K Z with said beams—at the same time with adjustment of the bar 7 of the slides Q within the holes in the stems of the said slides, and the readjustment of the couplings $T^2$ by means of the key or screw, or other equivalent, which "sets" each upon the axle.

These couplings are devised (besides, for the purpose of vertical motion in planting) to provide for required lateral motion of the beams in cultivating corn-rows, as well as for the adjustment of the beams in connection with the braces and slide-bar at various distances apart. These are constructed with an outer casing, $x$ $x$, inclosing the head of a beam between them at one end, to which they are bolted by the bolts $v$ $u$ vertically through the beam. The forward ends of the casing clasp a block, r, provided with an annular rib, to retain the same within a corresponding groove in said casings, which are bolted together at their junction in front of the axle.

The block r slides and is adjustable upon the axle by means of a key in making corn-rows wider or narrower, or in cultivating the same.

Each seed-box M receives the seed upon an upper plate, N, which has a circular opening, 4, in its center, the edges of which opening overlap a revolving disk, O, (of about five inches in diameter,) below. Said plate N carries the cut-off d, which is supported by one side of said opening 4 by a bridge, b, (or by an elastic arm,) and consists of a small horizontal plate, d, large enough to cover a corn-passage, p, of the disk O, upon the face of which said plate lies. This plate d has a vertical stem, which is held in a socket or cylinder supported by said bridge b, or by similar means. The disk O, immediately below said plate N, is pivoted to a fixed cross-piece, 8, at the bottom of the seed-box, and is pierced with six corn-passages, p, (more or less,) arranged equidistantly in a circle, provided with sliding adjustable corn-gages of a common form. The plate N does not rest upon the disk, but upon shoulders or pins 2 rising from the plate P, under the disk, or other support; or the plate P may be recessed to receive said disk. The latter has three ratchet-teeth occupying its periphery, which act as checks to prevent the disk from rotating too far at each motion of the slide Q, a pin, 5 5, on each end of which falls at the end of each motion into the recess behind a tooth. The disk is rotated by the striking of the dogs k k, on the slide below said disk, alternately upon one of the lugs l l l on the under surface of the disk, the plate P being channeled next to the slide and dogs for the free passage of the latter. (See dotted lines, Fig. 7.) The slide Q has two notches, f, or passages for corn, at the edge which passes under the corn-passage e of the plate P, situate under the cut-off plate d; but above the disk said plate is also cut away in a circular opening to admit of the circular motion of the lugs l l l of said disk.

The seed falls through the slide, at f f, into the spout S below, provided with a drop-valve of a common form.

The disk in each box is rotated one-sixth of a revolution (one-fifth if five holes, &c.,) at each passage of the slide Q, by the striking of the dogs k k alternately against one of the lugs l l l of the disk.

I also use two rotary disks to each box, of the same construction as that above described, with a cut-off common to both, and situate between them, with a slide like that above described doubled, or like two of the same joined together, at their seed-openings.

The operation of this machine is as follows, the dropping mechanism for planting corn being first described:

Each vibration of the slide Q causes one of the dogs k to strike one of the lugs l of the disk O, bringing at each time one of the holes p filled with corn under the cut-off d, which corn at the next motion is swept onto the slide Q, which at the next motion passes through one of the holes f in said slide, from which the seed is, as usual, alternately dropped on either side of the final dropper-valve in the spout S attached to the beam.

The drawings, Figs. 1 and 2, represent the machine as a planter, (in which operation I use all the shovels and rollers as auxiliaries;) but, in using it to cultivate corn, &c., the boxes M, cross-braces K Z, spouts S, rollers X, levers H Y, and seat L are removed, and the rearward bolt u of both couplings $T^2$ taken out to allow the necessary lateral motion to the beams T T and shovels in dodging irregularities in the line of planted corn, and adding the necessary plow-handles, with hooks on which to suspend the beams to the pole when necessary.

Cultivating may be done with four shovels only, if required, two on each beam; or the pair of rear shovels W W on each beam may be removed to the front in place of the single shovel U, the latter being now removed to the rear of the beam; but provided the field has been plowed or cultivated in the autumn or winter preceding the following spring, the soil may be cultivated and planted at one operation by this machine.

What I claim as my invention is—

In a corn-planter, the beams T, carrying the shovels and colters, as shown, the removable rollers X, the removable cross-bars K Z, seed-hoppers M, and the removable bolt v, constructed, combined, and adapted for converting the machine into a straddle-row cultivator, substantially in the manner as shown and set forth.

In testimony that I claim the foregoing combined planter and cultivator I have hereunto set my hand this 27th day of June, A. D. 1874.

THOMAS W. PAGE.

Witnesses:
C. D. HOBLITT,
THOS. BURLY.